United States Patent
Kim et al.

(10) Patent No.: US 7,818,167 B2
(45) Date of Patent: Oct. 19, 2010

(54) METHOD, MEDIUM, AND SYSTEM FOR MUSIC RETRIEVAL USING MODULATION SPECTRUM

(75) Inventors: Hyoung Gook Kim, Yongin-si (KR); Ki Wan Eom, Seoul (KR); Ji Yeun Kim, Seoul (KR); Yuan Yuan She, Beijing (CN); Xuan Zhu, Beijing (CN)

(73) Assignee: Samsung Electronics Co., Ltd., Suwon-Si (KR)

( * ) Notice: Subject to any disclaimer, the term of this patent is extended or adjusted under 35 U.S.C. 154(b) by 1084 days.

(21) Appl. No.: 11/511,436

(22) Filed: Aug. 29, 2006

(65) Prior Publication Data

US 2007/0192087 A1    Aug. 16, 2007

(30) Foreign Application Priority Data

Feb. 10, 2006   (KR)  ...................... 10-2006-0013125

(51) Int. Cl.
*G10L 19/00* (2006.01)
(52) U.S. Cl. ...................... 704/200.1; 704/203; 704/500
(58) Field of Classification Search ...................... 704/7, 704/205, 206, 270, 272, 273, 200.1, 200, 704/201, 203, 204, 500, 501; 369/59.1; 380/201
See application file for complete search history.

(56) References Cited

U.S. PATENT DOCUMENTS 7,110,338 B2 *  9/2006  Cheng et al. ................ 369/59.1
7,477,739 B2 *  1/2009  Haitsma et al. ............. 380/201
2005/0065976 A1  3/2005  Holm et al.
2005/0141707 A1  6/2005  Haitsma et al.

FOREIGN PATENT DOCUMENTS

| EP | 1 465 192 | 10/2004 |
|---|---|---|
| JP | 9-138691 | 5/1997 |
| JP | 10-134549 | 5/1998 |
| KR | 10-2005-0051857 | 6/2005 |
| KR | 10-2005-0068686 | 7/2005 |
| WO | 02/11123 | 2/2002 |
| WO | 03/067467 | 8/2003 |

* cited by examiner

*Primary Examiner*—Huyen X. Vo
(74) *Attorney, Agent, or Firm*—Staas & Halsey LLP

(57) ABSTRACT

An audio information retrieval method, medium, and system that can rapidly retrieve audio information, even in noisy environments, by extracting a modulation spectrum that is robust against noise, converting features of the extracted modulation spectrum into hash bits, and using a hash table. The audio information retrieval method may include extracting a modulation spectrum from audio data of a compressed domain, converting the extracted modulation spectrum into fingerprint bits, arranging the fingerprint bits in a form of a hash table, converting a received query into an address by a hash function corresponding to the query, and retrieving the audio information by referring to the hash table.

25 Claims, 6 Drawing Sheets

METHOD, MEDIUM, AND SYSTEM FOR MUSIC RETRIEVAL USING MODULATION SPECTRUM

CROSS-REFERENCE TO RELATED APPLICATIONS

This application claims the benefit of Korean Patent Application No. 10-2006-0013125, filed on Feb. 10, 2006, in the Korean Intellectual Property Office, the disclosure of which is incorporated herein by reference.

BACKGROUND OF THE INVENTION

1. Field of the Invention

Embodiments of the present invention relate to a music information retrieval method, medium, and system using a modulation spectrum, and more particularly, to a music information retrieval method, medium, and system that can rapidly retrieve music information having noise by extracting a modulation spectrum from music data, converting the extracted modulation spectrum into hash bits, and using a hash table.

2. Description of the Related Art

In conventional music information retrieval techniques, features for audio retrieval are extracted by using a power spectrum obtained by converting an audio signal into the frequency domain via a fast Fourier transform (FFT). Accordingly, the conventional music information retrieval techniques are not robust against potential noise.

In addition, the conventional music information retrieval techniques can not quickly retrieve and provide the desired information about a particular song identical to a user's query from a large-capacity database when a statistical method such as a Gaussian Mixture Model (GMM) and a Hidden Markov Model (HMM) is used. These models are widely utilized for audio retrieval.

Similarly, audio fingerprint systems have also been utilized in such conventional music information retrieval techniques, but these also are not robust against noise. In addition, when retrieving music information from music data that was obtained in a real life situation, e.g., music that was recorded or overheard from an outdoor area, such as on a street, system performance becomes deteriorated.

In addition, in the conventional music information retrieval techniques, a spectral flatness and a spectral crest measure have been utilized as identifying features, but such features are also not robust against various types of noisy environments. Further, since a Vector Quantization (VQ) or a Statistical Nearest Neighbor (SNN) method have been utilized with fingerprint indexing, information retrieval performance again becomes deteriorated in various types of noisy environments.

As such conventional music information retrieval techniques may also extract a modulation spectrum, utilizing a wave conversion in structures of various steps, and utilize a nearest neighbor classification method, music retrieval speed similarly becomes significantly decreased.

Accordingly, the inventors of the present invention have found a need for a method, medium, and system that is robust against noise and also can rapidly retrieve music information as needed.

SUMMARY OF THE INVENTION

An aspect of an embodiment of the present invention provides a method, medium, and system that can rapidly retrieve music information in a noisy environment by extracting a modulation spectrum that is robust against noise, converting features of the extracted modulation spectrum into hash bits, and using a hash table.

An aspect of an embodiment of the present invention also provides a method, medium, and system that can retrieve music information by a fingerprint based hash searching operation using features of a Modified Discrete Cosine Transformation-Modulation Spectrum (MDCT-MS) that is robust against noise.

An aspect of an embodiment of the present invention further provides a method, medium, and system that can retrieve music information by a fingerprint based soft hash searching operation using features of an MDCT-MS that is robust against noise.

An aspect of an embodiment of the present invention also provides a method, medium, and system that can retrieve music information by a hash searching operation using peak points according to features of an MDCT-MS that is robust against noise.

Additional aspects and/or advantages of the invention will be set forth in part in the description which follows and, in part, will be apparent from the description, or may be learned by practice of the invention.

To achieve the above and/or other aspects and advantages, embodiments of the present invention include an audio information storage method, including using a database and hash table generated by extracting a modulation spectrum from audio data, in a compressed domain of the audio data, converting the extracted modulation spectrum into fingerprint bits for each of the audio data, arranging the fingerprint bits in a form of the hash table, converting a received query into an address, using a hash function, corresponding to the query, and retrieving audio information from the database by using the address to refer to the hash table.

To achieve the above and/or other aspects and advantages, embodiments of the present invention include an audio information storage method, including generating a Modified Discrete Cosine Transformation-Modulation Spectrum (MDCT-MS) fingerprint database from audio data in corresponding compressed domains, generating a hash table by dividing each MDCT-MS fingerprint in the MDCT-MS fingerprint database into segments, extracting an MDCT-MS fingerprint from an audio clip, and dividing the extracted MDCT-MS fingerprint from the audio clip into segments and utilizing the audio clip segments as a hash value for referring to the MDCT-MS fingerprint database to retrieve a stored clip that matches the audio clip.

The method may further include calculating Bit Error Ratio (BER) values between the audio clip and indexed clips of the database, and comparing the calculated BER values to determine one of the indexed clips having a lowest BER value as a final result of the retrieving of the stored clip identical to the audio clip In addition, the generating of the hash table may include dividing each MDCT-MS fingerprint into a plurality of segments, each segment having an identical length, and generating the hash table by using the divided segments as the hash value.

The hash table may further correspond to each segment of the MDCT-MS fingerprints.

The method may further include acquiring unreliable bits with respect to the MDCT-MS fingerprints by ranking deviation values of neighboring frames of a corresponding MDCT-MS.

Here, the acquiring of the unreliable bits may include acquiring the unreliable bits with respect to a corresponding MDCT-MS fingerprint by setting a predetermined threshold with respect to the deviation values of the neighboring frames of the corresponding MDCT-MS.

To achieve the above and/or other aspects and advantages, embodiments of the present invention include an audio information storage method, for retrieving audio information from a database by referring to a hash table, based upon a received query converted into an address by a hash function, the method including extracting a corresponding modulation spectrum from audio data in corresponding compressed domains, converting the corresponding extracted modulation spectrum into fingerprint bits, and arranging the fingerprint bits in a form of the hash table for the retrieval of the audio data from the database based upon the address generated by the hash function.

To achieve the above and/or other aspects and advantages, embodiments of the present invention include an audio information storage method, including generating an MDCT-MS fingerprint database from audio data in corresponding compressed domains, generating a hash table for the generated MDCT-MS fingerprint database based on corresponding unreliable-bits-toggled MDCT-MS fingerprints, extracting an MDCT-MS fingerprint from an audio clip while calculating a hash value of the audio clip based on the unreliable-bits-toggled MDCT-MS fingerprints, and referring to the MDCT-MS database to retrieve a clip that matches1 the audio clip based on the hash value of the audio clip.

The method may further include calculating BER values between the audio clip and indexed clips and comparing the calculated BER values to determine one of the indexed clips having a lowest BER value as a final result of the retrieving of the clip matching the audio clip.

To achieve the above and/or other aspects and advantages, embodiments of the present invention include an audio information storage method, including generating an MDCT-MS fingerprint database from audio data in corresponding compressed domains, generating a hash table for the generated MDCT-MS fingerprint database by using corresponding peak points as a corresponding hash value, calculating a hash value, based on peak points, of an audio clip and extracting an MDCT-MS fingerprint of the audio clip, and referring to the MDCT-MS database to retrieve a clip that matches the audio clip, from clips that are maintained in the MDCT-MS fingerprint database, based on the calculated hash value of the audio clip.

The method may further include calculating BER values between the audio clip and indexed clips and comparing the calculated BER values to determine at least one of the indexed clips having a lowest BER value as a final result of the retrieving of the clip matching the audio clip.

Here, the corresponding hash value may utilize a corresponding first peak point and second peak point of the corresponding MDCT-MS.

In addition, corresponding hash value may utilize a distance between the corresponding first peak point and second peak point of the corresponding MDCT-MS.

Further, the generating of the hash table may further include generating the hash table by simultaneously utilizing information on a corresponding first peak point and second peak point of the corresponding MDCT-MS.

The retrieving of the audio clip may further include retrieving the matching clip from the MDCT-MS fingerprint database based on peak point information of the audio clip.

The method may still further include generating bits bias tolerance with respect to a corresponding first peak point and second peak point of the corresponding MDCT-MS.

To achieve the above and/or other aspects and advantages, embodiments of the present invention include at least one medium including computer readable code to implement embodiments of the present invention.

To achieve the above and/or other aspects and advantages, embodiments of the present invention include an audio information storage system, including an audio fingerprint generation unit to extract an MDCT-MS from audio data in a compressed domain and to generate an audio fingerprint of the audio data, and an audio data retrieval unit to refer to a database to retrieve retrieval audio data corresponding to the generated audio fingerprint.

The audio fingerprint generation unit may include an MDCT coefficient extraction unit to extract MDCT coefficients from the audio data in the compressed domain by partially decoding the audio data, an MDCT coefficient selection unit to select an MDCT coefficient, existing in a frequency domain not affected by noise, from the extracted MDCT coefficients, a modulation spectrum generation unit to perform a Discrete Fourier Transform (DFT) with respect to the selected MDCT coefficient and to generate an MDCT modulation spectrum (MDCT-MS) of the audio data, and a bit unit to quantize features of the generated MDCT-MS according to a bit derivation method.

In addition, the bit unit may rank absolute values according to the bit derivation method, select unreliable bits from quantized bits, and quantize the selected unreliable bits to '0' and '1' from '1' and '0', respectively.

The system may further include peak point extraction unit to extract peak points from the MDCT-MS features.

Here, the audio data retrieval unit may include a hash retrieval unit to generate a hash value from the generated audio fingerprint and to retrieve at least one candidate audio fingerprint from the database which matches the generated hash value by referring to a hash table, a fingerprint retrieval unit to compare the at least one retrieved candidate audio fingerprint and the generated audio fingerprint and retrieving one of the at least one candidate audio fingerprint that has a bit error rate smaller than a predetermined reference value, an information storage unit to store audio data information, each including corresponding candidate audio fingerprints, and an information providing unit to provide a user with audio data information corresponding to the one of the at least one candidate audio fingerprint.

The hash retrieval unit may include a hash value generation unit to extract an indexing bit from the generated audio fingerprint and to generate a hash value by a hash function, a hash table storing hash values corresponding to addresses referring to each candidate audio fingerprint in the database and an address referring to each corresponding audio data information, and a table retrieval unit to retrieve the one of the at least one candidate audio fingerprint which matches the generated hash value from the hash table.

In addition, the fingerprint retrieval unit may include an audio fingerprint storage unit to convert the audio data into the generated audio fingerprint and to store the generated audio fingerprint, a BER calculation unit to calculating a BER value of the at least one candidate audio fingerprint and the generated audio fingerprint, a comparison unit to compare a predetermined threshold and the calculated BER value, an audio fingerprint detection unit to detect the one of the at least one candidate audio fingerprint as having a BER value smaller than the threshold, and a threshold adjustment unit to adjust the threshold according to a result of the detection of the one of the at least one candidate audio fingerprint.

Here, the threshold adjustment unit may adjust the threshold until only a single candidate audio fingerprint, of the at least one candidate audio fingerprints, is detected from the audio fingerprint detection unit.

To achieve the above and/or other aspects and advantages, embodiments of the present invention include an audio information storage system, to be referred to for retrieval of a stored audio data, corresponding to a query audio data input, using a hash function, including an MDCT coefficient extraction unit to extract corresponding MDCT coefficients from audio data in corresponding compressed domains by partially decoding the audio data, an MDCT coefficient selection unit to select a corresponding MDCT coefficient, existing in a frequency domain not affected by noise, from the extracted corresponding MDCT coefficients, a modulation spectrum generation unit to perform a Discrete Fourier Transform (DFT) with respect to the selected corresponding MDCT coefficient and to generate a corresponding MDCT modulation spectrum (MDCT-MS) of the audio data, a bit unit to quantize features of the generated corresponding MDCT-MS according to a bit derivation method, and a storage to store a plurality of generated audio fingerprints in a database and/or to store a hash table corresponding to the plurality of generated audio fingerprints, based on results of the MDCT coefficient extraction unit, MDCT coefficient selection unit, modulation spectrum generation unit, and bit unit.

In addition, above, the audio data may be music data.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
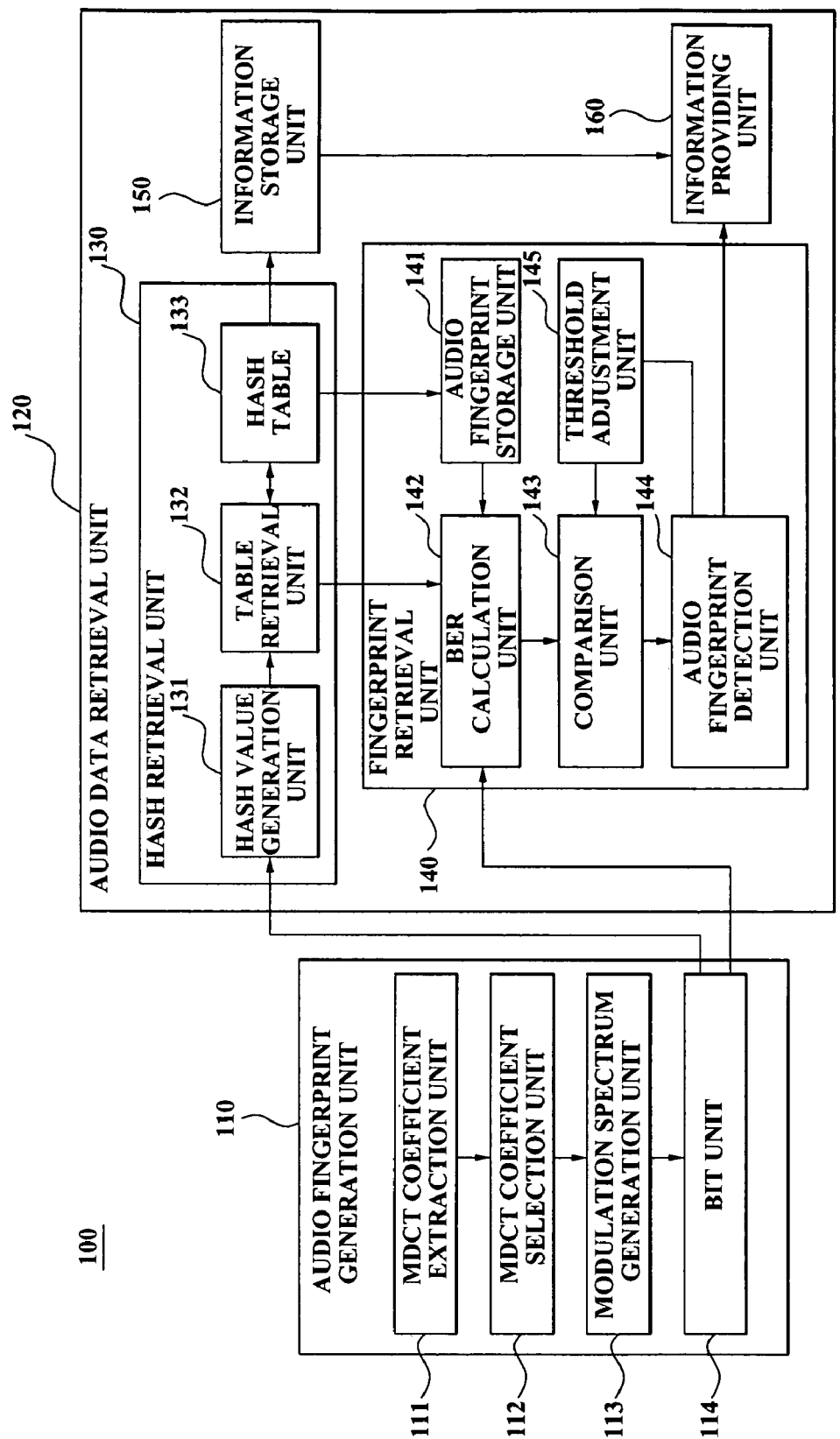
FIG. 1 illustrates a music information retrieval system, according to an embodiment of the present invention.

Reference will now be made in detail to embodiments of the present invention, examples of which are illustrated in the accompanying drawings, wherein like reference numerals refer to the like elements throughout. Embodiments are described below in order to explain the present invention by referring to the figures.

FIG. 1 illustrates a music information retrieval system, according to an embodiment of the present invention.

Referring to FIG. 1, a music information retrieval system 100, according to an embodiment, may include an audio fingerprint generation unit 110 and an audio data retrieval unit 120, for example.

The audio fingerprint generation unit 110 may extract a Modified Discrete Cosine Transformation-Modulation Spectrum (MDCT-MS) from music data of a compressed domain and generate an audio fingerprint. The audio fingerprint generation unit 110 may include an MDCT coefficient extraction unit 111, an MDCT coefficient selection unit 112, a modulation spectrum generation unit 113, and a bit unit 114, for example.

The MDCT coefficient extraction unit 111 extracts MDCT coefficients from the music data in the compressed domain by partially decoding the music data.

The MDCT coefficient selection unit 112 may select only MDCT coefficients which exist in a low frequency domain from the extracted MDCT coefficients. In this instance, the low frequency domain may includes rhythms of instrumental tunes and is not affected by noise.

The modulation spectrum generation unit 113 may perform a Discrete Fourier Transform (DFT) with respect to the selected MDCT coefficients and generate a modulation spectrum, so as to obtain a repeated tempo of a rhythm, for example. In this instance, since the modulate spectrum is extracted from music data in the compressed domain, the modulation spectrum does not change with respect to a time-invariant filtering effect and is also robust against noise. Here, again, it is noted that as the modulate spectrum can be extracted from music data in the compressed domain, noise has less of an affect.

The bit unit 114 may quantize features of the generated MDCT-MS of each clip according to a bit derivation approach. As an example, when a derivation between neighboring MDCT-MS points is greater than '0', the bit unit 114 may quantize a bit corresponding to the derivation to '1'. Also, when the derivation between the neighboring MDCT-MS points is less than '0', the bit unit 114 may quantize a bit corresponding to the derivation to '0', for example.

According to an embodiment, the music information retrieval system may reduce the size of an audio fingerprint by performing quantization, according to a process as described above, converting the audio fingerprint into a fingerprint that is more robust against noise and which may be able to be rapidly extracted from a large-capacity database by a querying clip by using a hash table.

The bit unit 114 may divide the MDCT-MS fingerprint into segments, for example, so as to maintain a high hit rate with a low false alarm rate.

As only an example, in one embodiment, when the MDCT-MS fingerprint is 1024 bits, the bit unit 114 may divide the MDCT-MS fingerprint into 128 segments. In this instance, each segment may include 8 bits and '$2^8=256$' entries with respect to each respective hash table. When it is assumed that the distribution of hash values is regular and an MDCT-MS fingerprint includes 250,000 clips, approximately 1000 clips will match each hash value. To maintain the hit rate, 32 hash values are generated using initial 32 segments. According to the above-described process, clips matching each querying clip are increased to 1000×32=32,000.

According to another embodiment, the bit unit 114 may rank absolute values according to the bit derivation approach, select unreliable bits from the quantized bits, and quantize the selected unreliable bits to '0' and '1', so as to prevent the quantized unreliable bits, by the absolute values, from being easily distorted by noise and thus, prevent a quantization error from occurring. A music information retrieval method using a fingerprint based soft hash searching method according to such an embodiment may improve a hit rate of music information retrieval by selecting the unreliable bits and preventing the quantized unreliable bits from being easily distorted by noise.

The audio data retrieval unit 120 may retrieve audio data corresponding to an audio fingerprint, e.g., generated in the audio fingerprint generation unit 110, and provide a user, for example, with information on the retrieved audio data. The audio data retrieval unit 120 may include a hash retrieval unit 130, a fingerprint retrieval unit 140, an information storage unit 150, and an information providing unit 160, for example.

The hash retrieval unit 130 may further include a hash value generation unit 131, a table retrieval unit 132, and a hash table 133, for example.

Here, the hash value generation unit 131 may extract an indexing bit from an audio fingerprint, e.g., generated in the bit unit 114, and generate a hash value by a hash function. In this instance, the indexing bit does not have a consecutive bit error.

According to another embodiment, the hash value generation unit 131 may generate a lookup table by selecting an $N^{th}$ bit of a sub-fingerprint, from the generated bits, and select a k number of unreliable bits from the selected sub-fingerprint.

As only an example, in an embodiment the hash table 133 may store hash values corresponding to an address of each audio fingerprint that is stored in the audio fingerprint storage unit 141, and an address of each audio data information that is stored in the information storage unit 150.

In this instance, the hash table 133 may be a lookup table that is generated using an N number of bits selected from bits of an MDCT-MS, e.g., as generated in the bit unit 114. Such a fingerprint based hash searching method, according to one embodiment, does not calculate a Bit Error Ratio (BER) between a given query and each clip of a music database, but selects N bits of sub-fingerprints which are selected from bits of each block, and utilizes the selected sub-fingerprint for indexing and, thus, generates the lookup table.

However, when an MDCT-MS fingerprint of the querying clip is distorted, e.g., by strong noise, and thereby, has a bit error, the hash table 133 may select neighboring M*N bits as hash values and generate an M number of lookup tables so as to improve a hit rate of the indexing.

According to another embodiment, in the hash table 133, the length of each segment may be expanded and the hash value also increased by unreliable-bits-toggling of an MDCT-MS fingerprint. As an example, when the each segment is 8 bits, the length of the each segment may be expanded to 16 bits and the hash value may become $2^{16}=65536$ by unreliable-bits-toggling.

Namely, such a music information retrieval method, according to this embodiment, may increase the hit rate in hash searching by toggling unreliable bits of the MDCT-MS fingerprint. Also, this music information retrieval method may further expand the hash table by toggling unreliable bits of the MDCT-MS fingerprint.

The table retrieval unit 132 may, thus, retrieve a hash value that matches a hash value generated in the hash value generation unit 131, from the hash table 133. In addition, the table retrieval unit 132 may output a candidate audio fingerprint to a BER calculation unit 142.

A hash searching method, according to an embodiment of the present invention, may arrange data in a hash table for rapidly searching data, for example. Here, when a key value of the data is given, the hash searching method may convert the key value into an address of the hash table by an appropriate hash function and retrieve the desired data. In this instance, the key value of data may include a number string or a character string that is a reference when encoding data. Further, in the hash searching method, according to an embodiment of the present invention, searching time may be regular without regard to the size of the hash table and may also be faster than an alternate searching method such as a binary search. In addition, with such a hash table approach, data may be easily inserted or deleted.

A hash function according to an embodiment of the present invention may be utilized when converting a key value into an address in the hash table. More particularly, the hash function enables data to be moved/stored from a set of key values to a set of addresses of the hash table. As the possible combinations of key values are much larger than the size of the hash table, the hash function, according to one embodiment, may be a many-to-one correspondence function. Further, in one hash function embodiment, it may be desirable that the calculation be faster and simpler and the number of cases that different key values output an identical address should be minimized. In addition, according to an embodiment, the hash table may have a deep relationship with a hash searching performance. Further, hash collisions may also be reduced depending upon which function is utilized.

Accordingly, a hash table according to the present invention will be referred to by a hash function and arranged with buckets storing data. In this instance, at least one record may be received in a single bucket. When several records are received in the bucket, each record will be referred to as a slot.

To input data into the hash table, the hash searching method, according to an embodiment of the present embodiment, may convert a given key value into the hash function and thereby obtain an address of the hash table. Here, when a bucket corresponding to the obtained address is empty, data may be stored/input into the bucket. Alternatively, according to an embodiment, if the corresponding bucket is not empty the attempt to store/input the data may be regarded to as a collision and an alternate position to store/input the data may be found. A method for solving such a collision may include a linear search, a binary search, a re-hash search, a hash chain, etc.

A hash searching method, according to embodiments of the present invention, thus, obtains a hash address according to the above and may thus recorded/obtain data from the address in the hash table, to retrieve the data that was previously stored/input into the hash table. However, in a hash searching method, another bucket may actually include the desired data, e.g., due to a collision, rather than the hash function address result. Accordingly whether data at the obtained address is the desired data may be determined by comparing key values and, if it is not the desired data, the desired data may be searched for, based upon particular collision rules, until the desired data is found.

Accordingly, with the above having been explained, the fingerprint retrieval unit 140 may include an audio fingerprint storage unit 141, a BER calculation unit 142, a comparison unit 143, an audio fingerprint detection unit 144, and a threshold adjustment unit 145, for example.

The audio fingerprint storage unit 141 may convert audio data into an audio fingerprint and then store the converted audio fingerprint.

The BER calculation unit 142 may calculate a BER value of a candidate audio fingerprint, e.g., as output in the table retrieval unit 132, and an audio fingerprint generated in the bit unit 114, for example, using a hamming distance.

The comparison unit 143 may compare a predetermined threshold and the calculated BER value and output a result of the comparison to the audio fingerprint detection unit 144.

Here, based on this comparison, the audio fingerprint detection unit 144 may further detect the audio fingerprint which has a BER value smaller than the predetermined threshold.

The threshold adjustment unit 145 may further adjust the threshold according to the detection result of the audio fingerprint detection unit 144. Namely, the threshold adjustment unit 145 may strictly adjust a threshold, which is loosely applied to an initial comparison in the comparison unit 143, according to the result of the detection in the audio fingerprint detection unit 144. Here, the threshold adjustment unit 145 may further repeatedly adjust the threshold until only a single audio fingerprint is detected in the audio fingerprint detection unit 144.

The information storage unit 150 may store audio data information corresponding to an audio fingerprint stored in the audio fingerprint storage unit 141. In this instance, the audio data information may include any types of information, such as a title of a song, a singer, a composer, a singsong writer, and a play time, for example. Alternative types of information are equally available.

In an embodiment, the information providing unit 160 may further extract audio data information corresponding to an audio fingerprint, which is detected in the audio fingerprint detection unit 144, from the information storage unit 150 and then provide a user with the extracted audio data information.

Accordingly, as described above, a music information retrieval system, according to any of the above-described embodiments, may generate and/or utilize an MDCT-MS fingerprint database of a music file and generate and/or use a hash table using an MDCT-MS fingerprint, to rapidly retrieve music information according to a hash searching method by extracting an MDCT-MS fingerprint from a query music file and utilize the extracted MDCT-MS fingerprint as a hash value.

Figure 2:
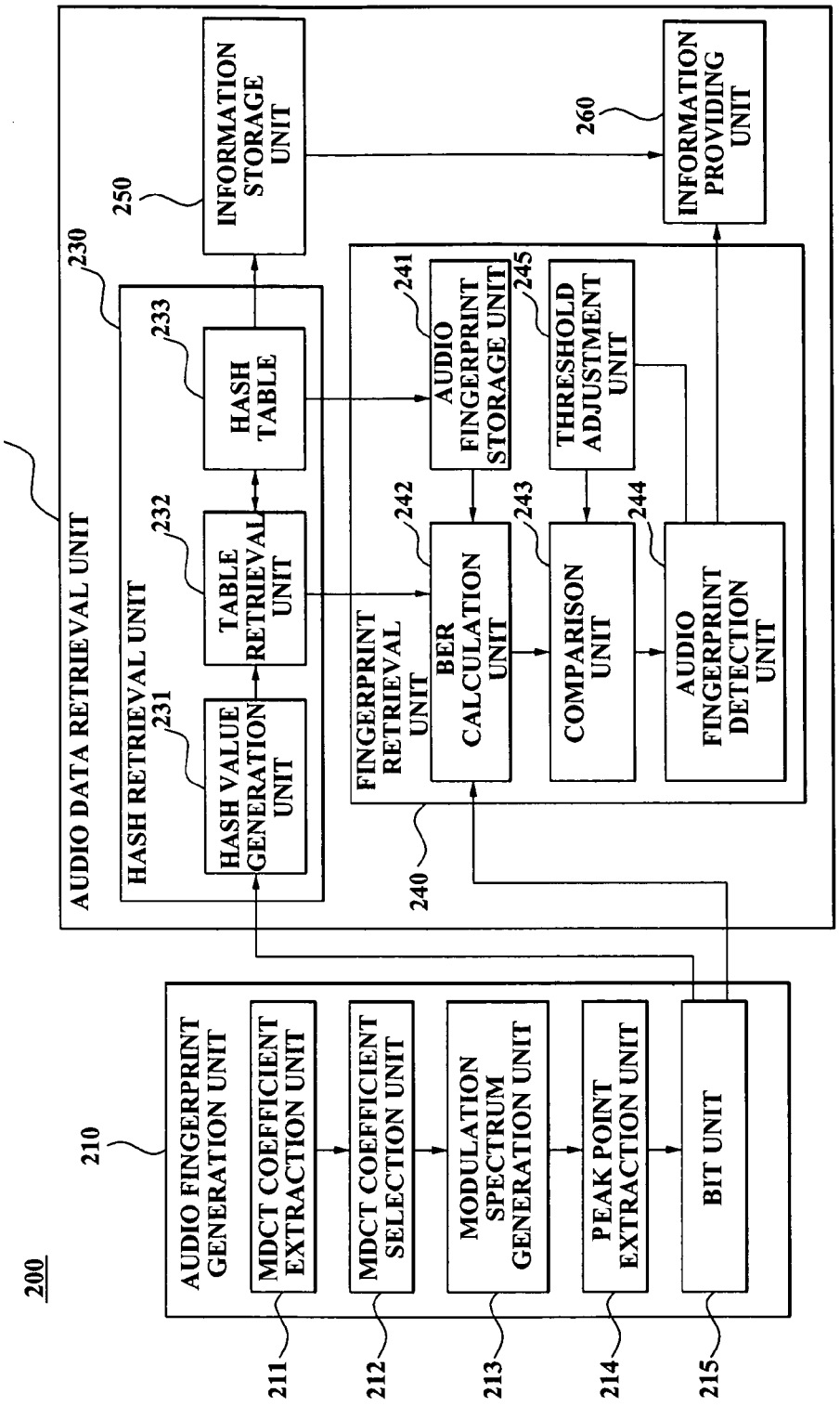
FIG. 2 illustrates a music information retrieval system, according to another embodiment of the present invention.

FIG. 2 illustrates a music information retrieval system, according to another embodiment of the present invention.

Referring to FIG. 2, a music information retrieval system 200, according to an embodiment of the present embodiment, may include an audio fingerprint generation unit 210 and an audio data retrieval unit 220.

The audio fingerprint generation unit 210 may extract an MDCT-MS from music data of a compressed domain and generate an audio fingerprint. The audio fingerprint generation unit 210 may further include an MDCT coefficient extraction unit 211, an MDCT coefficient selection unit 212, a modulation spectrum generation unit 213, a peak point extraction unit 214, and a bit unit 215, for example.

Again, the MDCT coefficient extraction unit 211 may extract MDCT coefficients from the music data in the compressed domain by partially decoding the music data.

Here, the MDCT coefficient selection unit 212 may select only MDCT coefficients that exist in a low frequency domain from the extracted MDCT coefficients. As noted above, the low frequency domain includes rhythms of instrumental tunes and is not affected by noise.

The modulation spectrum generation unit 213 may perform a DFT with respect to the selected MDCT coefficients and generate a modulation spectrum, so as to obtain a repeated tempo of a rhythm. In this instance, since the modulate spectrum is extracted from music data in the compressed domain, the modulation spectrum does not change with respect to a time-invariant filtering effect and is also robust against noise. Again, it is noted that the modulate spectrum is extracted from music data in the compressed domain.

The peak point extraction unit 214 may extract peak points from the generated modulation spectrum. Here, features of the modulation spectrum may indicate tempo information which has a frequency below about 1 kHz, for example. The peak position of the modulation spectrum may indicate a major rhythm value in a music signal. Further, the extracted peak points are not substantially affected by noise and are very robust against real noise. Accordingly, the peak points information is suitable for a hash value.

Figure 3:
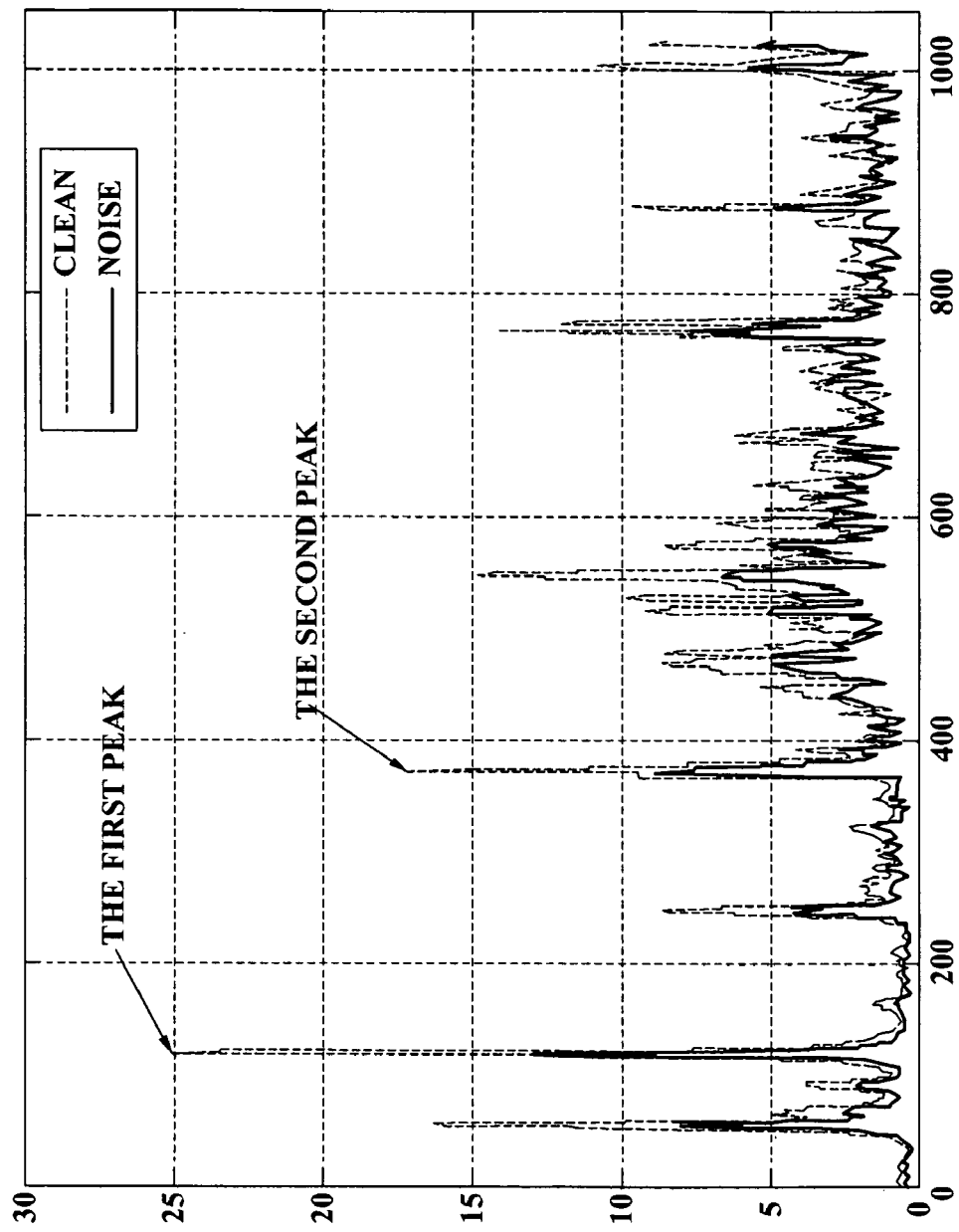
FIG. 3 illustrates an example of MDCT-MS features in a music information retrieval system, according to an embodiment of the present invention.

FIG. 3 illustrates an example of MDCT-MS features in a music information retrieval system, according to still another embodiment of the present invention.

As shown in FIG. 3, a first peak point and a second peak point, according to MDCT-MS features, may be extracted equally in both a clean environment without noise and in a noisy environment.

Since MDCT-MS features may indicate tempo information which has a frequency below about 1 kHz, for example, and the peak position of the MDCT-MS indicates a major rhythm value in a music signal, a music information retrieval method according to this embodiment may use the peak points since, similar to above, they are not substantially affected by noise and are very robust against noise.

In addition, in such a music information retrieval method, using peak points since the first peak point and the second peak point of the MDCT-MS are extremely robust against noise, such peak points information may be utilized as a hash value.

Here, the bit unit 215 may quantize peak points of the MDCT-MS for each clip, according to a bit derivation approach.

As an example, when a single block of the MDCT-MS fingerprint is quantized into 1024 bits, the peak point may be converted from 0 into 1023. In an embodiment, for example, when a maximum peak point is 1024 bits, an actual peak point may be distributed in an area of [1, 512]. When it is assumed that the first peak point is N and the second peak point is M, (1000*N+M) may be utilized as a hash function, for example. In this instance, the N and the M may correspond to 0<N<512 and 0<M<512, respectively.

An audio data retrieval unit 220 may further retrieve audio data corresponding to an audio fingerprint, e.g., generated in the audio fingerprint generation unit 210, and provide a user with information on the retrieved audio data. The audio data retrieval unit 220 may further include a hash retrieval unit 230, a fingerprint retrieval unit 240, an information storage unit 250, and an information providing unit 260, for example.

The hash retrieval unit 230 may include a hash value generation unit 231, a table retrieval unit 232, and a hash table 233, for example.

Here, the hash value generation unit 231 may extract an indexing bit from an audio fingerprint, e.g., generated in the bit unit 215, and generate a hash value by a hash function. In this instance, the indexing bit may not have a consecutive bit error. Further, the hash value generation unit 231 may utilize the peak points information, e.g., extracted in the peak point extraction unit 214, as the hash value. As an example, when utilizing a hash value of 18 bits, entries of the hash table 233 may become $2^{18}=262,144$.

Thus, according to an embodiment, the hash table 233 may store hash values corresponding to an address of each audio fingerprint that is stored in the audio fingerprint storage unit 241, and an address of each audio data information that is stored in the information storage unit 250.

In this instance, the hash table 233 is a lookup table that may be generated using an N number of bits selected from bits of an MDCT-MS, e.g., as generated in the bit unit 114. Similar to the fingerprint based hash searching method of the above-described embodiment of the present invention, an MDCT-MS fingerprint address corresponding to a fingerprint database may be recorded in the lookup table.

The table retrieval unit 232 may retrieve a hash value, which matches a hash value generated in the hash value generation unit 231, from the hash table 233. In addition, the table retrieval unit 232 may output a candidate audio fingerprint to a BER calculation unit 242. Namely, the table retrieval unit 232 may closely check the lookup table, i.e., the hash table 233, and retrieve an address of fingerprint blocks that have an identical peak point to the querying clip and output the retrieved fingerprints to the BER calculation unit 242 as the candidate audio fingerprint.

The fingerprint retrieval unit 240 may further include an audio fingerprint storage unit 241, a BER calculation unit 242, a comparison unit 243, an audio fingerprint detection unit 144, and a threshold adjustment unit 245, for example.

Here, the audio fingerprint storage unit 241 may convert audio data into an audio fingerprint and store the converted audio fingerprint.

The BER calculation unit 242 may calculate a BER value of a candidate audio fingerprint that is output by the table retrieval unit 232 and an audio fingerprint that is generated in the bit unit 215 using a hamming distance, for example.

The comparison unit 243 compares a predetermined threshold and the calculated BER value and outputs a result of the comparison to the audio fingerprint detection unit 244.

The audio fingerprint detection unit 244 may further detect an audio fingerprint that has a BER value smaller than a predetermined threshold according to the result of the comparison output from the comparison unit 243. Namely, the audio fingerprint detection unit 244 may calculate BER values between a fingerprint of the querying clip and a candidate fingerprint of the database and detect a block of the database having a lowest BER value.

The threshold adjustment unit 245 may adjust the threshold based on the result of the audio fingerprint detection unit 244. Namely, the threshold adjustment unit 245 may strictly adjust a threshold, which is loosely applied to an initial comparison in the comparison unit 243, according to the result of detection in the audio fingerprint detection unit 244. Further, the threshold adjustment unit 245 may repeatedly adjust the threshold until only a single audio fingerprint is detected in the audio fingerprint detection unit 244.

When the lowest BER value is below a pre-set threshold, the fingerprint retrieval unit 240 may select an audio fingerprint corresponding to the lowest BER value as a best matched song and may inform the information providing unit 260 of this event. Further, when the lowest BER value is not below the threshold, the fingerprint retrieval unit 240 may inform the information providing unit 260 that no song matches the querying clip in the database.

The information storage unit 250 may store audio data information corresponding to an audio fingerprint stored in the audio fingerprint storage unit 241. In this instance, the audio data information may include any types of information, such as a title of a song, a singer, a composer, a singsong writer, and a play time, for example.

The information providing unit 260, thus, may extract audio data information corresponding to an audio fingerprint, e.g., detected in the audio fingerprint detection unit 244, from the information storage unit 250 and provide a user with the extracted audio data information.

As described above, a music information retrieval system according to an above-described embodiment of the present invention may accurately retrieve music information even in a noisy environment by utilizing peak point information of a modulation spectrum.

Figure 4:
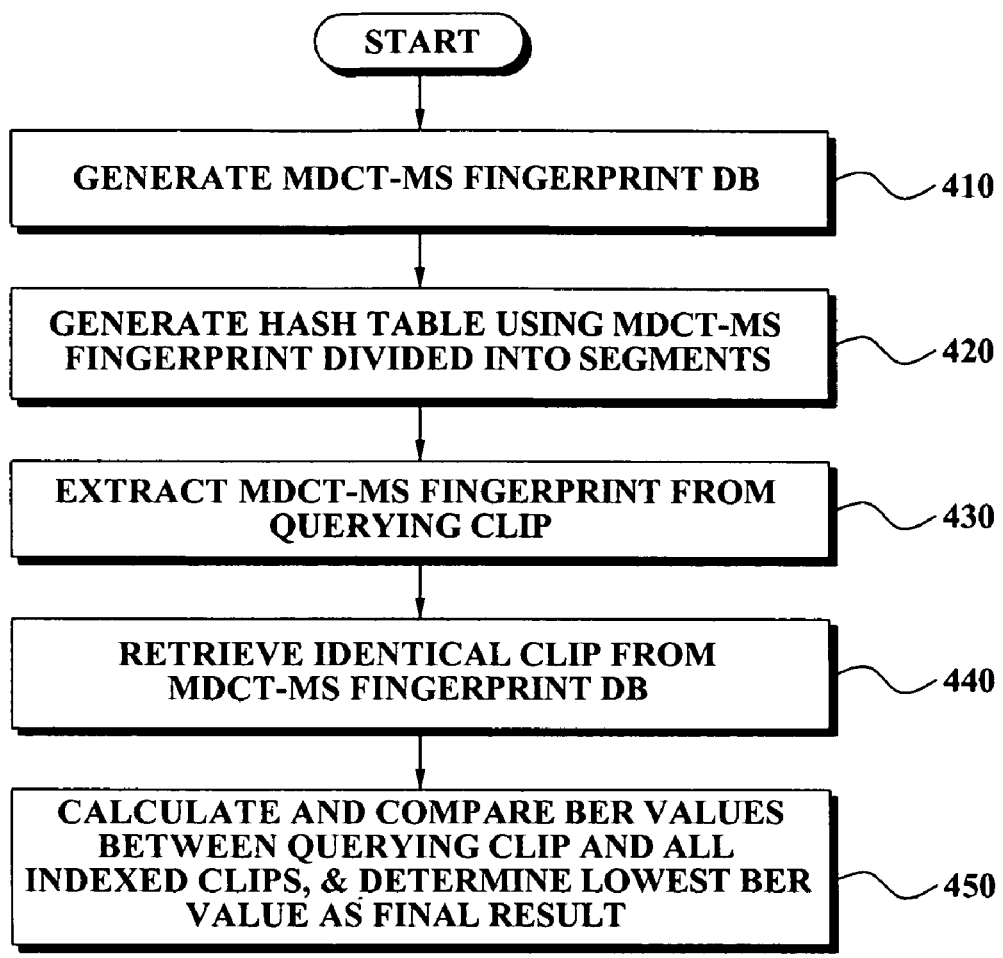
FIG. 4 illustrates a music information retrieval method, according to an embodiment of the present invention.

FIG. 4 illustrates a music information retrieval method, according to an embodiment of the present invention.

Referring to FIG. 4, in operation 410, if not already generated, MDCT-MS fingerprint database may be generated from music data of a compressed domain. In addition, according to an embodiment of the present invention, the MDCT-MS fingerprint database may enlarged by the addition of additional fingerprints, for example.

Namely, in operation 410, MDCT coefficients from the music data, in the compressed domain, may be extracted by partially decoding the music data, and only MDCT coefficients may be selected, for example, as they are not affected by noise, from the extracted MDCT coefficients. A DFT, with respect to the selected MDCT coefficients, may further be performed and thus, a modulation spectrum may be extracted and features of the extracted modulation spectrum quantized. Through the process described above, a MDCT-MS fingerprint database may be generated with respect to each available clip.

In operation 420, a hash table may be generated by using a corresponding MDCT-MS fingerprint that is divided into segments. According to an embodiment, the hash table may include hash values corresponding to an address of each audio fingerprint that is stored in a predetermined audio fingerprint storage unit and an address of each audio data information that is stored in a predetermined information storage unit.

Thus, in operation 420, the hash table may be generated by dividing the MDCT-MS fingerprint into a plurality of segments with an identical length, for example, and utilizing the divided segments as the hash value. In this instance, various types of hash tables may be generated with respect to the MDCT-MS fingerprint database in which each hash table corresponds to each segment of the MDCT-MS fingerprint.

In addition, in operation 420, unreliable bits with respect to the MDCT-MS fingerprint may be acquired/determined by ranking deviation values of neighboring frames of the MDCT-MS. Namely, unreliable bits, with respect to the MDCT-MS fingerprint, may be acquired/determined by setting a predetermined threshold with respect to the deviation values of neighboring frames of the MDCT-MS.

A music information retrieval method using a soft hash searching method, according to an above-described embodiment of the present invention, may increase a hash value of each MDCT-MS fingerprint and expand the hash table by toggling unreliable bits of the MDCT-MS fingerprint. Here, such a music information retrieval method may increase a hit rate with respect to hash searching by toggling unreliable bits of the MDCT-MS fingerprint.

In operation 430 an MDCT-MS fingerprint from a querying clip may be extracted.

Further, in operation 440, the extracted MDCT-MS fingerprint from the querying clip may be divided into segments, such that the segments may be used as a hash value and to retrieve an identical clip by referring to the MDCT-MS fingerprint database. Here, unreliable bits, with respect to the MDCT-MS fingerprint of the querying clip, may be toggled and the toggled unreliable bits may be applied to the hash value.

In operation 450, BER values, between the querying clip and all indexed clips, may be calculated and the calculated BER values may be compared to determine a lowest BER value as a final retrieval result.

As described above, according to the above-described embodiments of the present invention, music information may be retrieved even in various types of noisy environments by using MDCT-MS features. In addition, a song identical to a given querying clip may be rapidly retrieved from a large-capacity of stored songs.

Figure 5:
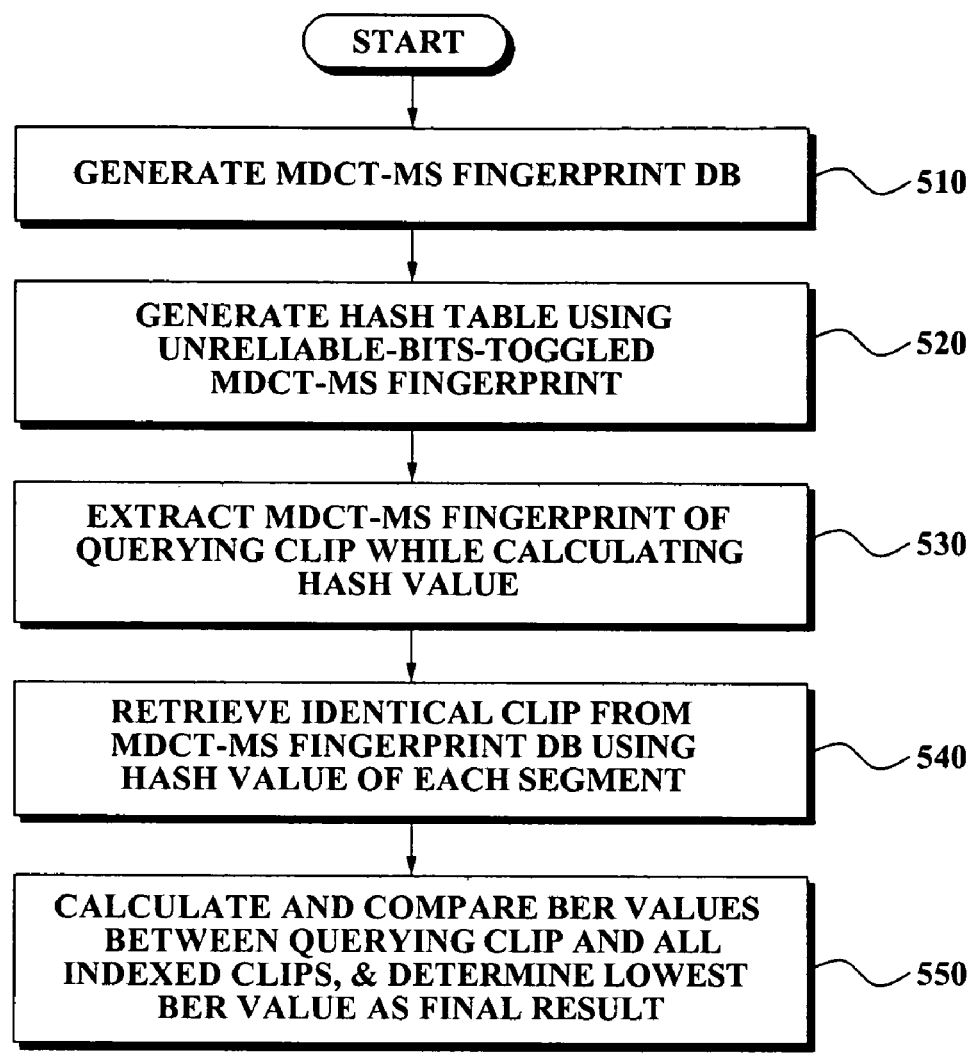
FIG. 5 illustrates a music information retrieval method, according to another embodiment of the present invention.

FIG. 5 illustrates a music information retrieval method according to another embodiment of the present invention.

Referring to FIG. 5, in operation 510, according to an embodiment, an MDCT-MS fingerprint database may be generated. Namely, in operation 510, MDCT coefficients may be extracted from music data in the compressed domain by partially decoding the music data, with only MDCT coefficients being selected, for example, as they are not affected by noise. A DFT, with respect to the selected MDCT coefficients, may be performed, and thus, a modulation spectrum may be extracted and features of the extracted modulation spectrum quantized. Through the process described above, the MDCT-MS fingerprint database may be generated with respect to each clip.

In operation 520, a hash table with an unreliable-bits-toggled MDCT-MS fingerprint may be generated. Here, a hash value of each MDCT-MS fingerprint may be increased by toggling unreliable bits with respect to the MDCT-MS fingerprint and the hash table may be expanded according to the increased hash value.

In operation 530, an MDCT-MS fingerprint may be extracted from a querying clip while calculating the hash value based on the unreliable-bits-toggled MDCT-MS fingerprint.

Further, in operation 540, the extracted MDCT-MS fingerprint, from the querying clip, may be divided into segments, such that the segments are utilized as a hash value and an identical clip may be retrieved by referring to the MDCT-MS fingerprint database.

In operation 550, BER values may be calculated between the querying clip and all indexed clips, calculated BER values may be compared, and a lowest BER value may be determined as a final retrieval result.

As described above, according to the above-described embodiment, a hit rate in retrieving music information may be increased by utilizing a soft hash searching method and adopting unreliable bits, rather than utilizing a simple hash searching method.

Figure 6:
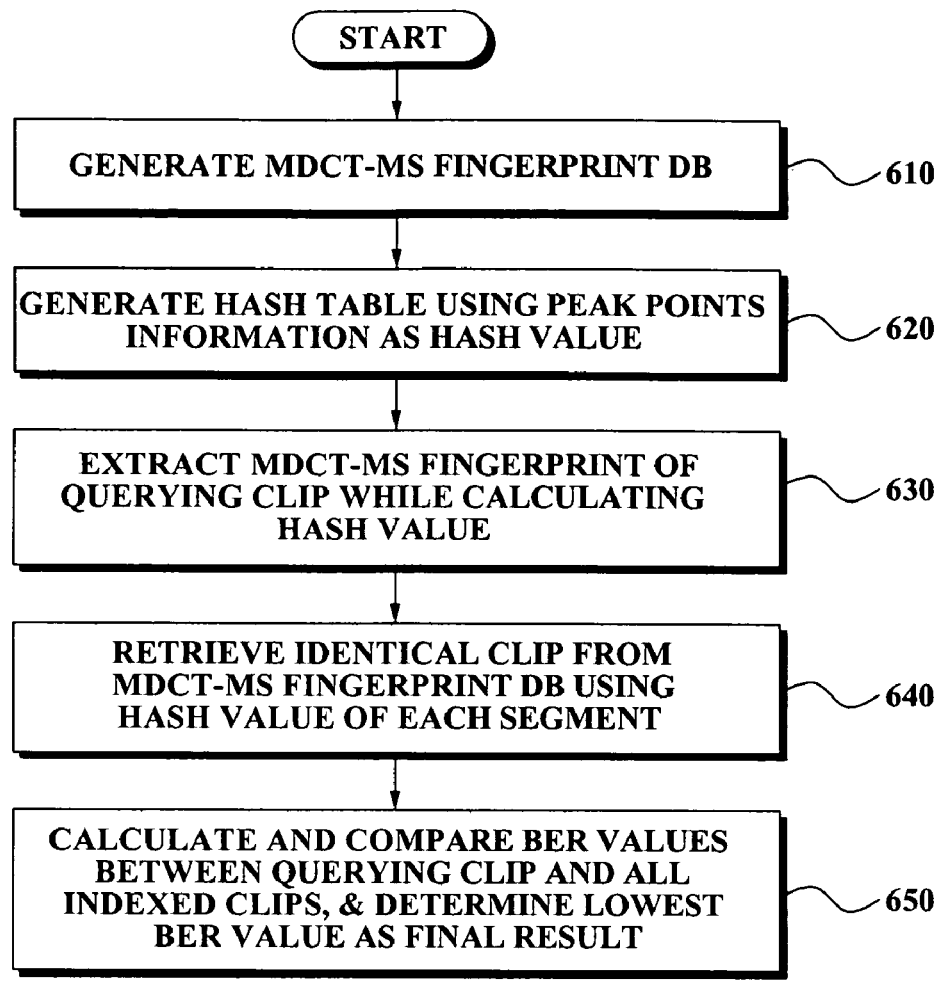
FIG. 6 illustrates a music information retrieval method, according to still another embodiment of the present invention.

FIG. 6 illustrates a music information retrieval method, according to still another embodiment of the present invention.

Referring to FIG. 6, in operation 610, an MDCT-MS fingerprint database may be generated.

In operation 620, a hash table may be generated by using peak point information as hash values. In this embodiment, a first peak point and a second peak point of the MDCT-MS are utilized as the hash value. Namely, the distance between the first peak point and the second peak point of the MDCT-MS may be utilized as the hash value. Further, in operation 620, the hash table may be generated by utilizing information on the first peak point and the second peak point.

In addition, in operation 620, the bit length of the hash value may be expanded by utilizing information on the first peak point and the second peak point of the MDCT-MS.

Still further, in operation 620, a bit bias tolerance may be generated with respect to the first peak point and the second peak point of the MDCT-MS.

Thus, the music information retrieval method, according to this above-described embodiment, may increase a hash value of each MDCT-MS fingerprint by utilizing an error tolerance setting with respect to the first peak point and the second peak point of the MDCT-MS. In addition, the music information retrieval method may increase a hit rate of hash searching by utilizing the error tolerance setting with respect to the peak points. Further, the music information retrieval method may expand a hash table by utilizing the error tolerance setting with respect to the peak points.

Still further, as described above, this music information retrieval method, according to an embodiment, may extract a first peak point and a second peak point of the MDCT-MS equally in both a clean environment without noise and a noisy environment, as shown in FIG. 3. Accordingly, the music information retrieval method may be very robust against noise.

In operation 630, a hash value may be calculated based on the peak points and an MDCT-MS fingerprint of a querying clip may be extracted.

In operation 640, a clip identical to the querying clip may be retrieved from clips that are maintained in the MDCT-MS fingerprint database by using the calculated hash value of each segment. Namely, here, a clip identical to the querying clip may be retrieved from the MDCT-MS fingerprint database by using peak points of the querying clip.

In operation 650, the music information retrieval system may calculate BER values between the querying clip and all indexed clips, such that the calculated BER values are compared and a lowest BER value is determined to be a final retrieval result.

As described above, the music information retrieval method, according to the embodiments of the present invention, may rapidly retrieve music information, even with noise, by retrieving music information using peak points of a modulation spectrum.

In addition to the above described embodiments, embodiments of the present invention can also be implemented through computer readable code/instructions in/on a medium, e.g., a computer readable medium. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), for example. The media may also be a distributed network, so that the computer readable code is stored/transferred and executed in a distributed fashion.

According to an embodiment of the present invention, there may be provided a music information retrieval method, medium, and system that can rapidly retrieve music information in a noisy environment by extracting a modulation spectrum, converting features of the extracted modulation spectrum into hash bits, and using a hash table.

According to an embodiment of the present invention, there may be provided a music information retrieval method, medium, and system that can rapidly retrieve a song identical to a given querying clip from a large-capacity music database by using a hash searching method, rather than a conventional statistical classification method.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An audio information storage method, comprising:
generating a Modified Discrete Cosine Transformation-Modulation Spectrum (MDCT-MS) fingerprint database from audio data in corresponding compressed domains;
generating a hash table by dividing each MDCT-MS fingerprint in the MDCT-MS fingerprint database into segments;
extracting an MDCT-MS fingerprint from an audio clip;
dividing the extracted MDCT-MS fingerprint from the audio clip into segments and utilizing the audio clip segments as a hash value for referring to the MDCT-MS fingerprint database to retrieve a stored clip that matches the audio clip; and acquiring unreliable bits with respect to MDCT-MS fingerprints by ranking deviation values of neighboring frames a corresponding MDCT-MS.

2. The method of claim 1, further comprising calculating Bit Error Ratio (BER) values between the audio clip and indexed clips of the database, and comparing the calculated BER values to determine one of the indexed clips having a lowest BER value as a final result of the retrieving of the stored clip identical to the audio clip.

3. The method of claim 1, wherein the generating of the hash table comprises:

dividing each MDCT-MS fingerprint into a plurality of segments, each segment having an identical length; and
generating the hash table by using the divided segments as the hash value.

4. The method of claim 1, wherein the hash table corresponds to each segment of the MDCT-MS fingerprints.

5. The method of claim 1, wherein the acquiring of the unreliable bits comprises acquiring the unreliable bits with respect to a corresponding MDCT-MS fingerprint by setting a predetermined threshold with respect to the deviation values of the neighboring frames of the corresponding MDCT-MS.

6. At least one non-transitory computer readable medium comprising computer readable code to control at least one processing element to implement the audio information storage method of claim 1.

7. An audio information storage method, comprising:

generating a Modified Discrete Cosine Transformation-Modulation Spectrum (MDCT-MS) fingerprint database from audio data in corresponding compressed domains;
generating a hash table for the generated MDCT-MS fingerprint database based on corresponding unreliable-bits-toggled MDCT-MS fingerprints;
extracting an MDCT-MS fingerprint from an audio clip while calculating a hash value of the audio clip based on the unreliable-bits-toggled MDCT-MS fingerprints; and
referring to the MDCT-MS database to retrieve a clip that matches the audio clip based on the hash value of the audio clip.

8. The method of claim 7, further comprising calculating Bit Error Ratio (BER) values between the audio clip and indexed clips and comparing the calculated BER values to determine one of the indexed clips having a lowest BER value as a final result of the retrieving of the clip matching the audio clip.

9. At least one non-transitory computer readable medium comprising computer readable code to control at least one processing element to implement the audio information storage method of claim 7.

10. An audio information storage method, comprising:

generating a Modified Discrete Cosine Transformation-Modulation Spectrum (MDCT-MS) fingerprint database from audio data in corresponding compressed domains;
generating a hash table for the generated MDCT-MS fingerprint database by using corresponding peak points as a corresponding hash value;
calculating a hash value, based on peak points, of an audio clip and extracting an MDCT-MS fingerprint of the audio clip; and
referring to the MDCT-MS database to retrieve a clip that matches the audio clip, from clips that are maintained in the MDCT-MS fingerprint database, based on the calculated hash value of the audio clip.

11. The method of claim 10, further comprising calculating Bit Error Ratio (BER) values between the audio clip and indexed clips and comparing the calculated BER values to determine at least one of the indexed clips having a lowest BER value as a final result of the retrieving of the clip matching the audio clip.

12. The method of claim 10, wherein the corresponding hash value utilizes a corresponding first peak point and second peak point of the corresponding MDCT-MS.

13. The method of claim 12, wherein corresponding hash value utilizes a distance between the corresponding first peak point and second peak point of the corresponding MDCT-MS.

14. The method of claim 10, wherein the generating of the hash table further comprises generating the hash table by simultaneously utilizing information on a corresponding first peak point and second peak point of the corresponding MDCT-MS.

15. The method of claim 10, wherein the retrieving of the audio clip further comprises retrieving the matching clip from the MDCT-MS fingerprint database based on peak point information of the audio clip.

16. The method of claim 10, further comprising:

generating bits bias tolerance with respect to a corresponding first peak point and second peak point of the corresponding MDCT-MS.

17. At least one non-transitory computer readable medium comprising computer readable code to control at least one processing element to implement the audio information storage method of claim 10.

18. An audio information storage system, comprising:

an audio fingerprint generation unit to extract a Modified Discrete Cosine Transformation-Modulation Spectrum (MDCT-MS) from audio data in a compressed domain and to generate an audio fingerprint of the audio data; and
an audio data retrieval unit to refer to a database to retrieve retrieval audio data corresponding to the generated audio fingerprint,
wherein the audio fingerprint generation unit comprises:
a Modified Discrete Cosine Transformation (MDCT) coefficient extraction unit to extract MDCT coefficients from the audio data in the compressed domain by partially decoding the audio data;
an MDCT coefficient selection unit to select an MDCT coefficient, existing in a frequency domain not affected by noise, from the extracted MDCT coefficients;
a modulation spectrum generation unit to perform a Discrete Fourier Transform (DFT) with respect to the selected MDCT coefficient and to generate an MDCT modulation spectrum (MDCT-MS) of the audio data; and
a bit unit to quantize features of the generated MDCT-MS according to a bit derivation method.

19. The system of claim 18, wherein the bit unit ranks absolute values according to the bit derivation method, selects unreliable bits from quantized bits, and quantizes the selected unreliable bits to '0' and '1' from '1' and '0', respectively.

20. The system of claim 18, further comprising:

a peak point extraction unit to extract peak points from the MDCT-MS features.

21. The system of claim 18, wherein the audio data retrieval unit comprises:

a hash retrieval unit to generate a hash value from the generated audio fingerprint and to retrieve at least one candidate audio fingerprint from the database which matches the generated hash value by referring to a hash table;

a fingerprint retrieval unit to compare the at least one retrieved candidate audio fingerprint and the generated audio fingerprint and retrieving one of the at least one candidate audio fingerprint that has a bit error rate smaller than a predetermined reference value;

an information storage unit to store audio data information, each comprising corresponding candidate audio fingerprints; and an information providing unit to provide a user with audio data information corresponding to the one of the at least one candidate audio fingerprint.

22. The system of claim 21, wherein the hash retrieval unit comprises:

a hash value generation unit to extract an indexing bit from the generated audio fingerprint and to generate a hash value by a hash function;

a hash table storing hash values corresponding to addresses referring to each candidate audio fingerprint in the database and an address referring to each corresponding audio data information; and a table retrieval unit to retrieve the one of the at least one candidate audio fingerprint which matches the generated hash value from the hash table.

23. The system of claim 21, wherein the fingerprint retrieval unit comprises:

an audio fingerprint storage unit to convert the audio data into the generated audio fingerprint and to store the generated audio fingerprint;

a Bit Error Ratio (BER) calculation unit to calculating a BER value of the at least one candidate audio fingerprint and the generated audio fingerprint;

a comparison unit to compare a predetermined threshold and the calculated BER value;

an audio fingerprint detection unit to detect the one of the at least one candidate audio fingerprint as having a BER value smaller than the threshold; and a threshold adjustment unit to adjust the threshold according to a result of the detection of the one of the at least one candidate audio fingerprint.

24. The system of claim 23, wherein the threshold adjustment unit adjusts the threshold until only a single candidate audio fingerprint, of the at least one candidate audio fingerprints, is detected from the audio fingerprint detection unit.

25. An audio information storage system, to be referred to for retrieval of a stored audio data, corresponding to a query audio data input, using a hash function, comprising:

a Modified Discrete Cosine Transformation (MDCT) coefficient extraction unit to extract corresponding MDCT coefficients from audio data in corresponding compressed domains by partially decoding the audio data;

an MDCT coefficient selection unit to select a corresponding MDCT coefficient, existing in a frequency domain not affected by noise, from the extracted corresponding MDCT coefficients;

a modulation spectrum generation unit to perform a Discrete Fourier Transform (DFT) with respect to the selected corresponding MDCT coefficient and to generate a corresponding MDCT modulation spectrum (MDCT-MS) of the audio data;

a bit unit to quantize features of the generated corresponding MDCT-MS according to a bit derivation method; and a storage to store a plurality of generated audio fingerprints in a database and/or to store a hash table corresponding to the plurality of generated audio fingerprints, based on results of the MDCT coefficient extraction unit, MDCT coefficient selection unit, modulation spectrum generation unit, and bit unit.

\* \* \* \* \*